United States Patent Office 3,646,159
Patented Feb. 29, 1972

3,646,159
**POLYCARBONATE/POLYACETAL THERMO-
PLASTIC RESIN COMPOSITIONS**
Gerald W. Miller, Pittsburgh, Pa., assignor to Baychem
Corporation, New York, N.Y.
No Drawing. Filed Mar. 13, 1968, Ser. No. 712,615
Int. Cl. C08f *29/30, 45/34;* C08g *39/10*
U.S. Cl. 260—860                                    9 Claims

ABSTRACT OF THE DISCLOSURE

Blends of polycarbonates with polyacetals wherein the polyacetal is present in the blend at a concentration sufficient to impart thereto a resistance to environmental stress crazing and cracking greater than that possessed by the polycarbonate itself.

---

This invention relates to thermoplastic resin compositions and more particularly is concerned with polycarbonate resin mixtures having improved resistance to environmental stress crazing and cracking.

Aromatic carbonate polymers are well known, commercially available materials having a variety of applications in the plastics art. Such carbonate polymers may be prepared by reacting a dihydric phenol, such as 2,2 bis-(4-hydroxyphenyl)-propane, with a carbonate precursor such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength, a high heat resistance, and a dimensional stability far surpassing that of any other thermoplastic material. However, in certain applications the use of aromatic polycarbonate resins is limited since they exhibit severe environmental stress crazing and cracking. By "environmental stress crazing and cracking" is meant the type of failure which is hastened by the presence of organic solvents such as, for example, acetone, heptane and carbon tetrachloride when such solvents are in contact with stressed parts fabricated from aromatic polycarbonate resins. Such contact may occur, for example, when the solvents are used to clean or degrease stressed parts fabricated from polycarbonate resins, or when certain compositions commonly employed as coatings are applied to polycarbonates.

As known to those skilled in the art, the environmental stress crazing and cracking characteristics of polycarbonate resins have been termed their most serious deficiency, and a variety of methods have been proposed in an effort to reduce the propensity of stressed polycarbonate parts to craze and crack while in contact with organic solvents such as those mentioned above. Such methods have never been entirely satisfactory, however, since they generally have an adverse effect upon the desirable properties of polycarbonate resins. Consequently, a means for reducing the environmental stress crazing and cracking of polycarbonate resins without appreciably affecting any of their desirable properties has heretofore not been available.

It is therefore an object of this invention to provide a polycarbonate polymer composition which is devoid of the foregoing disadvantages.

Another object of this invention is to provide a process by which polycarbonate materials may be rendered solvent resistant.

A further object of this invention is to provide a polycarbonate composition which may be used with coatings systems which heretofore were deleterious to polycarbonate resins.

The foregoing objects and others which will become apparent from the following description are accomplished in accordance with this invention, generally speaking, by providing blends of thermoplastic polycarbonate polymers with polyacetals wherein the polyacetal is present in the blend at a concentration sufficient to impart thereto a resistance to environmental stress crazing and cracking greater than that possessed by the polycarbonate itself. Generally, the polycarbonate is present in the blend at a concentration of a maximum of about 75% by weight based on the combined weight of the polycarbonate and the polyacetal, preferably from about 5% to about 75%, and the polyacetal is present at a concentration of a minimum of about 25% by weight based on the combined weight of the polycarbonate and the polyacetal, preferably from about 25% to about 95%.

By blending polycarbonates with polyacetal resins in accordance with this invention, a composition is obtained which is far more resistant to stress crazing under high stress conditions than the polycarbonate resin itself. Further, the polycarbonate-polyacetal blend composition will yield a product which resists the inherent propensity of the polycarbonate to stress crack in the presence of the aforementioned solvents. In addition to exhibiting an increased resistance to environmental stress crazing and cracking, the improved polycarbonate resin mixtures of the invention exhibit a relatively high impact strength without a substantial loss of tensile properties, and to a larger extent, retain the high softening temperatures of unmodified polycarbonates resin materials. The resin mixtures of this invention also have higher heat distortions, particularly in the case of a 50/50 blend and they retain their Izod impact strengths, even for 60/40 polyacetal/polycarbonate blends which also exhibit excellent solvent resistance. The fact that the addition of the polyacetal to a polycarbonate resin system in the indicated proportion range provides a resinous mixture having an improved resistance to stress cracking and crazing, particularly with regard to that induced by solvents, is unexpected and not fully understood. For example, the polyacetals used herein to provide the improved polycarbonate resin mixtures may themselves be subject to crazing and cracking while under stress and while in contact with various organic solvents and accordingly would not be expected to improve the environmental stress craze and crack resistance of other thermoplastic materials.

Any suitable polycarbonate may be blended with a polyacetal in accordance with this invention to achieve the advantageous results set forth herein. For example, the polycarbonate composition may be produced from a dihydroxydiaryl alkane and phosgene, a haloformate or a diester of carbonic acid, for example, as described in Canadian Pats. 578,585; 661,282; 578,795; 594,805 and U.S. Patent 3,028,365 and the like. Some such polycarbonate polymers for example, will contain the repeating units

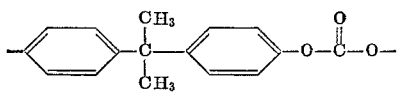

Other processes which may be used in the production of polycarbonates which may be treated in accordance with the process of this invention include those referred to in Chemistry and Physics of Polycarbonates by Hermann Schnell and in Polycarbonates by William F. Christopher and Daniel W. Fox as well as those described in U.S. Pats. 2,999,846; 2,970,137; 2,991,273; 2,999,835; 3,014,891; 3,030,331 and the like. Further, any suitable components or conditions set forth in the foregoing references as well as any of those well known in the art may be used in order to prepare the polycarbonate to be employed in accordance with this invention. It is most preferable, however, that the blend composition of the instant invention be prepared from a low molecular weight polycarbonate; that is, one which has a weight average molecular weight of from about 5,000 to about 40,000 and preferably about 20,000 to about 30,000, in order to obtain the utmost advantages described herein. These types of polycarbonate materials are preferred because they present ideal blending characteristics due to their low melt viscosity, their improved miscibility with other polymers and their low molecular weights.

Any suitable polyacetal may be used in preparing the blend of this invention. Preferably, polyacetals having a melt viscosity characteristic of 5,000 to 50,000 poise at a shear rate of 72 sec.$^{-1}$ at 182° C. (L/D=10) may be used to blend with the thermoplastic polycarbonate polymers described herein. One class of polyacetal commonly referred to as polyoxymethylenes is preferred, although other materials designated as polyacetals, e.g., trioxane, may also be used. Polyoxymethylenes are prepared generally by two techniques; the first is the polymerization of anhydrous monomeric formaldehyde, accomplished under various reaction conditions and in the presence of various catalysts well known in the art. Suitable catalysts for the polymerization of formaldehyde include primary, secondary and tertiary aliphatic amines, cycloaliphatic amines, primary aromatic amines, arsines, stibenes, phosphines, morpholines, hydrazines, substituted hydrazines, substituted morpholines, piperidines, metal hydrocarbons, carbodiimides, redox catalysts, and the like. Polyoxymethylenes can also be prepared by the polymerization of trioxane, generally in the presence of a suitable catalyst. Some such suitable catalysts for the polymerization of trioxane include antimony trifluoride, antimony fluorborate, bismuth trifluoride, bismuth oxyfluoride, alkane sulfonic acids, thioanyl chloride, phosphorous trichloride, stannic chloride, titanium tetrachloride, zirconium chloride and the like.

The polyoxymethylene polyacetals can be prepared either in the solvent phase or in the vapor phase. For example, the particular material to be polymerized may be dissolved in a suitable solvent or the material, that is, trioxane, for example, may be reacted in a vapor phase. In addition to pure polyoxymethylenes, trioxane and/or formaldehyde can be polymerized to form copolymerized polyoxymethylenes by conducting the reaction in the presence of a co-monomer such as, for example, 2-chloromethyl oxyethylene, cyclic ethers, alkylene carbonates such as, for example, ethylene carbonate, propylene carbonate and the like. Due to the rapid degradation of polyoxymethylenes, it is generally desirable to stabilize the end group by reaction with a suitable end blocking agent such as, for example, hydrazine, substituted hydrazine, urea, thiourea, substituted urea and thioureas, aromatic amines, phenols, N,N,N',N'-tetra(hydroxyalkyl)alkylene diamine, carboxylic acids, carboxylic acid anhydrides, carboxylic acid esters, organic monoisocyanates and the like.

In addition to polyoxymethylenes, polyacetals formed by the reaction of aldehydes with glycols may be used. Any suitable aldehyde may be used such as, for example, formaldehyde, acetaldehyde, propionaldehyde, butyraldehyde, isobutyraldehyde, benzaldehyde, cinnamaldehyde, acrolein, crotonaldehyde, beta-ethyl-alpha-methyl acrolein, alpha methyl acrolein and the like. Any suitable glycol may be used in the preparation of the polyacetal such as, for example, the polyalkylene ether glycols and the dihydric alcohols mentioned in U.S. Pat. 3,201,372.

It has been found that any polyacetal having the melt viscosity characteristics set forth herein can be used in combination with the polycarbonates of this invention to achieve a solvent resistant composition. Although it is clear that any suitable polyacetal may be used as described herein, it is generally preferred that those acetals which are employed contain the acetal oxygen grouping as part of the polymeric backbone as opposed to those polymeric products wherein the acetal group is pendant or secondary to the main polymeric chain.

The polycarbonate blends of the instant invention may be prepared in any suitable manner as meets the exigencies of the occasion and the equipment at hand as long as a thorough distribution of the polyacetal in the polycarbonate resin is obtained. For example, the mixing of materials may be accomplished by a variety of methods normally employed for the incorporation of plasticizers or fillers into thermoplastic polymers including but not limited to mixing rolls, dough mixers, Banbury mixers, and other mixing equipment. The resultant mixtures may be handled in any conventional manner employed for the fabrication or manipulation of thermoplastic resins. The materials may be formed or molded using compression, injection and calendering techniques and the like. It should be understood that the polycarbonate resin mixtures prepared in accordance with the invention may also contain other additives to lubricate, prevent oxidation or otherwise stabilize the material or lend color to it. Such additives are well known in the art and may be incorporated without departing from the scope of the invention.

The polymeric compositions of the instant invention having improved resistance to environmental stress cracking and crazing are useful in preparing gaskets, tubing and other materials which have an improved resistance to crazing and cracking when in contact with organic cleansing solvents such as acetone, heptane, carbon tetrachloride, trichloroethylene and the like. Such resinous mixtures may also be cross-linked by means of electronic irradiation and may be used in molding powder formulations either alone or in combination with fillers such as, for example, wood flour, diatomaceous earth, silica, carbon black and the like to make molded parts of various shapes.

Films of the improved polycarbonate resin mixtures of the invention are useful as wrapping or packaging materials, as metal or fiber liners, containers, covers, closures, electrical insulating tape, electrical capacitors, sound recording tapes, pipe covering and the like. Because of their improved craze resistant properties, the polycarbonate resin mixtures of the invention may be used as surface coverings for appliances and the like, or as coatings for rods and wire, as slot insulation in dynamoelectric machines and in bonding materials for parts for laminates as well as in adhesive formulations. They are also efficacious as wire enamels and may be readily mixed with pigment, stabilizers and plasticizers. The compositions of the invention may also be mixed with other resinous materials.

The invention is further illustrated but is not intended to be limited by the following examples in which all parts and percentages are by weight unless specified.

Polyacetal A

About 27 parts of liquid formaldehyde at solid carbon dioxide acetone temperature are poured into about 420 parts of an anhydrous diethyl ether and the solution stored overnight at this temperature. The polymer formed is removed by gravity filtration under a blanket of nitrogen. As the clear, colorless solution is stirred rapidly under nitrogen and cooled by a solid CO₂/acetone bath, a solution of about 0.1 part tributyl amine in about 10.7 parts of anhydrous diethyl ether are added. The solution immediately becomes cloudy and gel particles separate. Stirring and cooling are continued for 2 days and thereafter filtered to separate the polymer thus formed. The polymer is washed with ether and then air and vacuum dried.

About 25 parts of Polyacetal A 300 ml. of acetic anhydride and about 0.12 parts of sodium acetate are placed in a reaction vessel. This mixture is stirred and heated under refluxing conditions (about 139° C.) for approximately 1 hour. The reaction mixture is then cooled and the product filtered. The filter cake is then washed once with a 250 ml. portion of acetone and three times or more with 250 ml. portions of distilled water. The washed filter cake is then reslurried in a high speed blender with water followed by filtering and washed once with a 250 ml. portion of water and then a 250 ml. portion of acetone. Di-beta-naphthyl-para-phenylene diamine antioxidant is then incorporated into the polymer by washing the polymer with about 200 ml. of acetone containing about 0.135 part of the antioxidant. The treated polymer is then dried in a vacuum oven for about 4 hours at 65° C.

Polyacetal B

About 69 parts of alpha polyoxymethylene are pyrolyzed over a period of about 100 minutes and the monomeric formaldehyde thus produced is continuously swept at atmospheric pressure with a slow stream of nitrogen through two traps held at −15° C. then into the top of a reaction chamber held at −30° C. and containing a rapidly agitated mixture of about 523 parts of tetrahydronaphthylene and about 5 parts of a non-ionic dispersing agent which is the esterification product of a polyethylene glycol having a molecular weight of 400 with oleic acid. Polymer begins to form as soon as the formaldehyde enters the reaction chamber and continues to form throughout the reaction period. The resulting thick slurry is stirred for an additional 30 minutes at −30° C. The product is removed by filtration and washed with ether and then air and vacuum dried. The snow white granular polyoxymethylene exhibits an inherent viscosity of 1.66 measured in parachlorophenyl. This polymer is compression molded into a test sample at 190° C.

Polyacetal C

A solution of 100 grams trioxane and 400 ml. of benzene is heated to boiling and a small amount of water is removed by use of a Dean-Stark trap. Then approximately 75 ml. is distilled off. The solution is cooled to 25° C. and 0.1 gram BF₃-etherate is added with stirring. After about fifteen minutes the solution begins to turn cloudy. Stirring is continued for about 24 hours. The slurry is filtered and the polymer refluxed twice with 500 ml. water, filtered and dried overnight at 60–65° C. A yield of 27.6 grams of polyoxymethylene is obtained. A white translucent disc is compression molded at 180° C. for 2 minutes by using 10 percent diphenylamine as stabilizer for the polymer. The unstabilized polymer showed an inherent viscosity of 0.65 when measured in p-chlorophenol (containing 2% alpha pinene) at 60° C. at 0.5 percent concentration.

EXAMPLES 1–6

A mixture is prepared by dry blending the indicated amounts of Polyacetal A with the indicated amounts of a polycarbonate prepared by the phosgenation of 2,2-(4,4'-dihydroxydiphenyl)propane set forth in Table I. The mixture is extruded into strands through an extruder equipped with a two-stage single screw, pelletized and molded into the appropriate test pieces for Izod impact (ASTM D–256–56), heat distortion (ASTM D–648–56) and solvent crazing (Mandrel test with CCl₄ and acetone on bars measuring 5″ x ⅛″ x ½″ with an outer fiber stress across the mandrel of about 7,500 p.s.i.) tests with the results set forth in Table I. Good results were achieved using blends of up to about 75% of the polycarbonate and 25% of the polyacetal.

EXAMPLE 7

A mixture of about 50 parts of Polyacetal B are dry blended with about 50 parts of the polycarbonate described in Examples 1–6. The mixture is extruded into strands through an extruder equipped with a two-stage single screw, pelletized and molded into the appropriate test pieces for tensile strength and elongation tests according to ASTM D–638–61T. The ultimate tensile strength value is 10,400 p.s.i. and the elongation is 20%.

EXAMPLE 8

A mixture is prepared by dry blending the amounts of Polyacetal C with the polycarbonate described in Examples 1–6 as set forth in Table I. After extruding, pelletizing and molding the compositions as described in Examples 1–6, the same tests described in Examples 1–6 are performed. The results obtained are substantially the same as those set forth in Table I for Examples 1–6.

TABLE 1

| Polycarbonate/polyacetal blend | Impact behavior (⅛″ bars), ft. lbs./in. notch | Heat distortion, °C. | Solvent resistance time to failure, Min. |
|---|---|---|---|
| 50/50 | 1.4 | 145 | 480 |
| 60/40 | 4.3 | 139 | 480 |
| 70/30 | 5.0 | 138 | 10–50 |
| 80/20 | 15.0 | 137 | 0.5 |
| 90/10 | 14.0 | 137 | (¹) |
| 100/0 | 17.0 | 137 | (¹) |

¹ Immediately.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A thermoplastically blended mixture of a maximum of about 75% by weight of a polycarbonate resin and a minimum of about 25% by weight of a polyacetal resin having a melt viscosity characteristic of 5,000 to 50,000 poise at a shear rate of 72 sec.⁻¹ at 182° C. (L/D=10), the weight percentages being based on the combined weight of the polycarbonate and the polyacetal.

2. The mixture of claim 1 wherein the polyacetal is present at a concentration of at least about 25% by weight based on the combined weight of the polycarbonate and the polyacetal and in a quantity sufficient to impart to the mixture a resistance to environmental stress crazing and cracking greater than that possessed by the polycarbonate.

3. The mixture of claim 1 wherein the polycarbonate is an aromatic polycarbonate.

4. The mixture of claim 1 wherein the polyacetal is a polyoxymethylene.

5. The mixture of claim 1 wherein the polycarbonate contains the repeating units

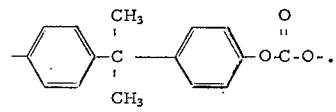

6. The mixture of claim 1 wherein the polycarbonate has a weight average molecular weight of up to about 40,000.

7. The mixture of claim 1 wherein the polyacetal is prepared by polymerizing trioxane.

8. The mixture of claim 1 wherein the polyacetal is formed by the reaction between an aldehyde and a glycol.

9. The mixture of claim 8 wherein the glycol is a polyalkylene ether glycol or a polyhydric alcohol.

References Cited
UNITED STATES PATENTS

| | | | |
|---|---|---|---|
| 3,290,261 | 12/1966 | Goldblum | 260—860 |
| 3,364,157 | 1/1968 | Halek et al. | 260—860 |
| 3,431,224 | 3/1969 | Goldblum | 260—860 |
| 3,144,431 | 8/1964 | Dolce et al. | 260—67 |

OTHER REFERENCES

Plastics (London), No. 313, November 1963, Polyformaldehyde: pp. 72–75, (TP 986 AI P65), 260/67FP, Smith.

Reinhold Plastics Application Series, "Acetal Resins," Akin, May 1962, pp. 15–18, 23 and 67–71.

Modern Plastics Encyclc., 1964 (September 1963, vol. 41/No. 1A), pp. 116–120, "Acetal Resins," Hamilton et al.

WILLIAM H. SHORT, Primary Examiner

E. WOODBERRY, Assistant Examiner

U.S. Cl. X.R.

260—32.8, 874